United States Patent
Ueno et al.

(10) Patent No.: US 7,513,631 B2
(45) Date of Patent: Apr. 7, 2009

(54) LIGHTING DEVICE

(75) Inventors: Hiroshi Ueno, Aichi (JP); Kouichi Itoigawa, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 31 days.

(21) Appl. No.: 11/844,457

(22) Filed: Aug. 24, 2007

(65) Prior Publication Data
US 2008/0055882 A1    Mar. 6, 2008

(30) Foreign Application Priority Data
Aug. 30, 2006    (JP)    ............................ 2006-234312

(51) Int. Cl.
*G01D 11/28*    (2006.01)
(52) U.S. Cl. ................................ 362/30; 362/26; 362/23
(58) Field of Classification Search .................. 362/23, 362/24, 26, 28, 29, 30, 33, 85, 86, 88, 97, 362/326, 327, 328, 330, 332, 333, 336, 338, 362/471, 489, 551, 555, 606, 607, 609–613, 362/615–620, 623, 800, 812, 308–317; 200/8–317; 116/200, 202
See application file for complete search history.

(56) References Cited

U.S. PATENT DOCUMENTS

| | | | | |
|---|---|---|---|---|
| 3,491,245 | A | * | 1/1970 | Hardesty ............... 250/227.11 |
| 5,397,867 | A | | 3/1995 | Demeo |
| 5,677,702 | A | * | 10/1997 | Inoue et al. ................... 345/32 |
| 6,065,846 | A | * | 5/2000 | Kato et al. ..................... 362/30 |

FOREIGN PATENT DOCUMENTS

| | | |
|---|---|---|
| DE | 10 2004 056 886 A1 | 6/2006 |
| JP | 08-194219 | 7/1996 |

* cited by examiner

*Primary Examiner*—Hargobind S Sawhney
(74) *Attorney, Agent, or Firm*—Patterson, Thuente, Skaar & Christensen, P.A.

(57) ABSTRACT

A lighting device including an LED, which is located immediately below a first illumination window, for illuminating not only the first illumination window but also a second illumination window. The lighting device includes a light guide plate for transmitting light from the LED. The light guide plate includes first and second recess groups defined at locations corresponding to the first illumination window. The light guide plate further includes a third recess group defined at a location corresponding to the second illumination window.

9 Claims, 3 Drawing Sheets

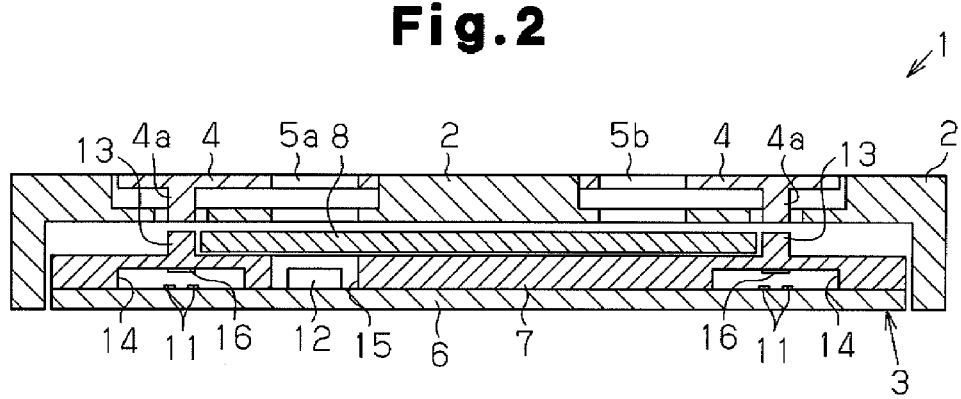
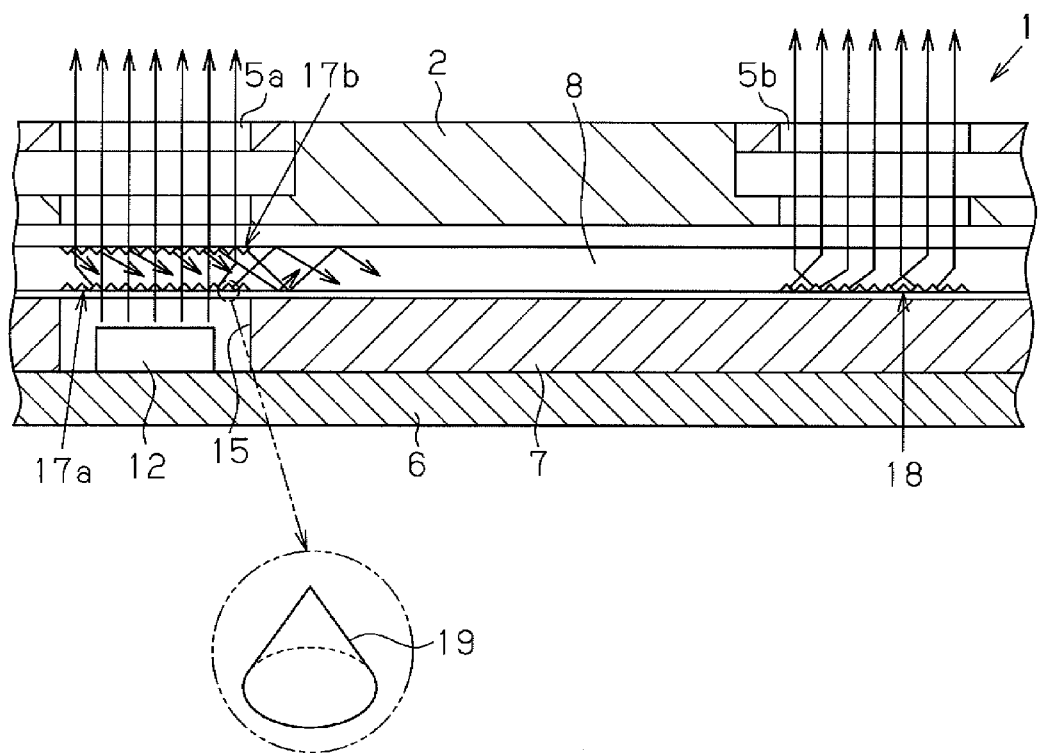

LIGHTING DEVICE

CROSS-REFERENCE TO RELATED APPLICATIONS

This application is based upon and claims the benefit of priority from prior Japanese Patent Application No. 2006-234312, filed on Aug. 30, 2006, the entire contents of which are incorporated herein by reference.

BACKGROUND OF THE INVENTION

The present invention relates to a lighting device for illuminating an operation portion of an operation device.

A typical lighting device arranged in, for example, a passenger compartment of a vehicle illuminates an operation portion during the nighttime. This enables the position of the operation portion to be identified.

Referring to FIG. 4, an operation device 51 of the prior art includes a cover panel 53 and a switch assembly 54, which is arranged at the rear side of the cover panel 53. The cover panel 53 includes a plurality of operation portions 52. A plurality of illumination windows 57 are respectively arranged adjacent to the plurality of operation portions 52. The switch assembly 54 includes a circuit board 55 and an elastic sheet 56 covering the circuit board 55. The circuit board 55 includes switch elements respectively located at positions corresponding to the operation portions 52. The circuit board 55 also includes a plurality of light sources 58, such as top-view type LEDs, respectively located at positions corresponding to the illumination windows 57.

Each light source 58 emits light through the corresponding illumination window 57 and out of the cover panel 53. The light also illuminates the corresponding operation portion 52. This enables recognition of the operation portion 52 during the nighttime.

However, the operation device 51 of the prior art requires each operation portion 52 to be provided with the light source 58. This increases the components mounted on the circuit board 55, enlarges the circuit board 55, and imposes restrictions on the component layout of the circuit board 55. Further, the light sources 58 may have different qualities. In such a case, the light brightness would differ between operation portions 52.

Japanese Laid-Out Patent Publication No. 8-194219 describes a lighting device that uses a light guide to illuminate a plurality of illumination windows.

Referring to FIG. 5, a lighting device 61 includes an acrylic light guide plate 62. A light source 63, such as a side view type LED, is arranged beside the light guide plate 62. The light guide plate 62 includes a plurality of projections 64 formed on a surface opposite to a light emitting surface 62a. The light source 63 emits light that enters one end surface of the light guide plate 62. The projections 64 reflect the light toward the light emitting surface 62a.

In the side-view type lighting device 61, the light source 63 and a circuit board, which is used to activate the light source 63, must be arranged beside the light guide plate 62. This enlarges the footprint size of the lighting device 61 and imposes restrictions on the component layout of the light source 63.

SUMMARY OF THE INVENTION

The present invention provides a compact and simple operation device that illuminates a plurality of illumination windows and has a high level of design freedom.

One aspect of the present invention is a lighting device provided with a cover panel including a plurality of illumination windows. A light source is arranged in the cover panel at a location corresponding to a first one of the illumination windows to emit light in a first direction. A plate-shaped light guide is arranged between the cover panel and the light source along a plane perpendicular to the first direction. A first reflection structure is formed on the light guide at a location corresponding to the light source. The first reflection structure emits part of the light from the light source toward the first illumination window and diffuses and reflects the remaining light to guide the remaining light into the light guide. A second reflection structure is formed on the light guide at a location spaced from the location corresponding to the light source and corresponding to a remote one of the illumination windows excluding the first illumination window to reflect the light guided into the light guide toward the remote illumination window.

A further aspect of the lighting device includes a light source. A plate-shaped light guide extends in a direction perpendicular to a direction in which light is emitted from the light source. A cover panel covers the light guide plate and includes a plurality of illumination windows illuminated by the light from the light source. The plurality of illumination windows include a first illumination window arranged immediately above an emission portion of the light source and a remote illumination window arranged at a location spaced from the light source and from the first illumination window. The light guide includes a first reflection structure locally formed at a location corresponding to the light source and the first illumination window and a second reflection structure locally formed at a location corresponding to the remote illumination window. The first reflection structure transmits a controlled amount of the light from the light source toward the first illumination window and guides the remaining light into the light guide. The second reflection structure reflects a controlled amount of the light guided into the light guide toward the remote illumination window.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 is a cross-sectional view taken along line 2-2 in FIG. 1;

FIG. 3 is an enlarged cross-sectional view of the operation device shown in FIG. 1;

DETAILED DESCRIPTION OF THE PREFERRED EMBODIMENTS

An operation device 1 serving as a lighting device according to a preferred embodiment of the present invention will now be discussed with reference to FIGS. 1 to 3.

Figure 1:
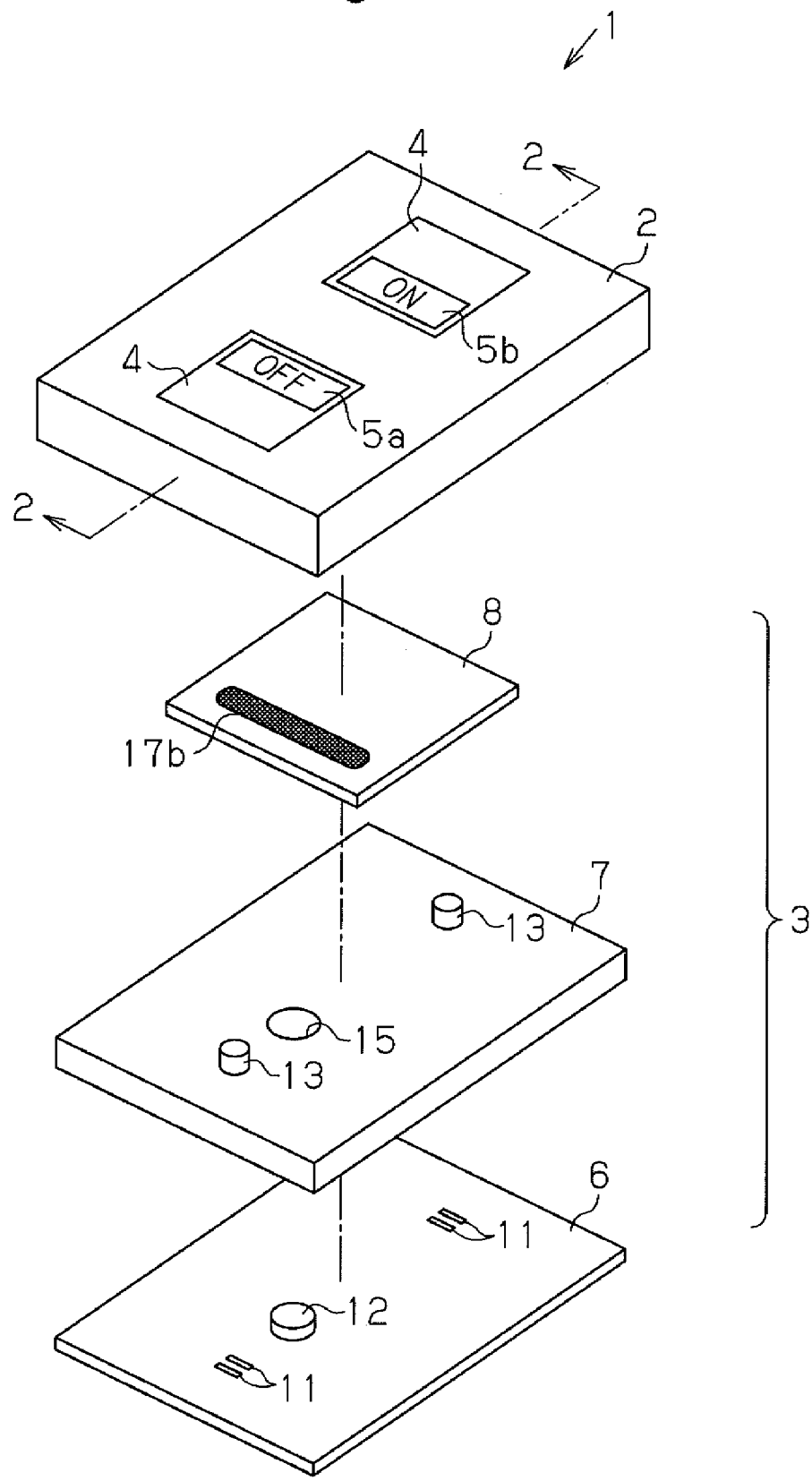
FIG. 1 is an exploded perspective view showing an operation device according to a preferred embodiment of the present invention.
Figure 4:
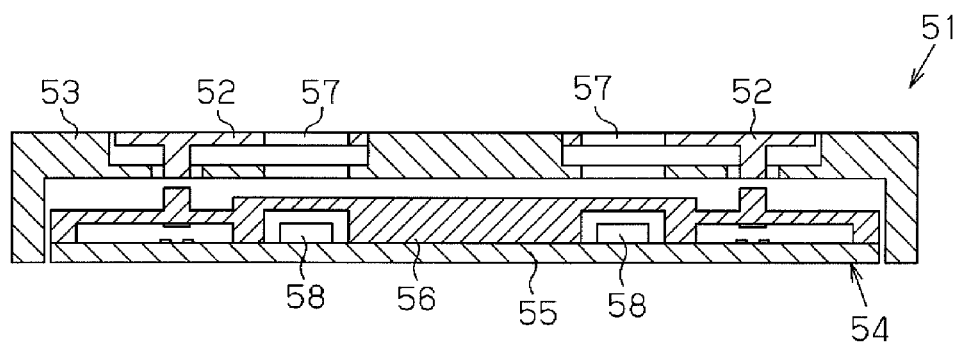
FIG. 4 is a cross-sectional view of a prior art operation device.

Referring to FIG. 1, the operation device 1 includes a cover panel 2 and a switch assembly 3, which is arranged at the rear side (lower side as viewed in FIG. 1) of the cover panel 2. The operation device 1 is arranged, for example, near the driver's seat in a vehicle on a steering wheel or a dashboard.

As shown in FIG. 2, a plurality of (for example, two) operation portions 4 are exposed from the outer surface of the cover panel 2. Each operation portion 4 is supported by a hinge of the cover panel 2 in a manner tiltable relative to the cover panel 2. The operation portion 4 may be formed integrally with the cover panel 2.

An activation projection 4a extends downward from each operation portion 4. The operation portions 4 include transparent or semi-transparent illumination windows 5a and 5b. Light is emitted out of the cover panel 2 through the illumination window 5a and 5b.

The letters "ON" are printed on one of the operation portions 4, and the letters "OFF" are printed on the other operation portion 4. The two illumination windows 5 receive light from a light source, or LED 12. This brightens the letters of the two illumination windows 5a and 5b and entirely illuminates the two operation portions 4.

Referring to FIGS. 1 and 2, the switch assembly 3 includes a circuit board 6, an elastic sheet 7, and a light guide plate 8. The circuit board 6 is arranged at the bottom of the switch assembly 3. The elastic sheet 7 is a planar elastic member formed of an elastomeric material and arranged on the circuit board 6. The light guide plate 8 is arranged on the elastic sheet 7.

The circuit board 6 has an upper surface including two fixed contact pairs 11 respectively corresponding to the two operation portions 4. Each of the fixed contact pairs 11 functions as a switch element. The light source, or the top view type LED 12, is arranged on the circuit board 6 at a position corresponding to the illumination window 5a. The LED 12 emits light in a direction perpendicular to the plane of the circuit board 6.

The illumination window 5a is one example of a illumination window located directly above a light emission portion of the light source. The illumination window 5b is one example of a remote illumination window that is not located directly above the light emission portion of the light source.

The elastic sheet 7, which is transparent or semi-transparent, is formed from a resilient soft resin such as silicone rubber. The elastic sheet 7 covers the entire upper surface of the circuit board 6. The elastic sheet 7 may be dimensioned so that it covers at least the fixed contact pairs 11. The elastic sheet 7 includes first projections 13 pressed by the activation projections 4a of the operation portions 4, respectively.

As shown in FIG. 2, the elastic sheet 7 includes diaphragms arranged in correspondence with the operation portions 4. The first projections 13 are respectively formed on the upper surfaces of the diaphragms. The diaphragms each define a contact compartment 14, which accommodates a movable contact 16 and fixed contact pair 11.

A receptacle 15 extends through the elastic sheet at a position corresponding to the LED 12 of the circuit board 6. The receptacle 15 functions as a light source chamber for receiving the LED 12.

When one of the operation portions 4 is pushed, the corresponding activation projection 4a pushes the first projection 13 and resiliently deforms the associated diaphragm of the elastic sheet 7. The resilient deformation of the diaphragm causes contact between the corresponding movable contact 16 and fixed contact pair 11. As a result, the fixed contact pair 11 becomes conductive. When the operation portion 4 is released, the elastic sheet 7 (diaphragm) returns to its original form, and the movable contact 16 becomes spaced from the fixed contact pair 11. In this manner, the pushing of the operation portion 4 opens and closes the fixed contact pair 11.

The light guide plate 8 is formed from a light guiding material such as a transparent acrylic resin, a transparent styrene resin, and a transparent urethane resin. The light guide plate 8 is arranged parallel to the elastic sheet 7. In the illustrated example, the light guide plate 8 is smaller than the elastic sheet 7 and extends to at least overlap each one of the illumination windows 5a and 5b.

The light guide plate 8 will now be described in detail with reference to FIG. 3. The light guide plate 8 includes a first reflection structure formed locally at locations corresponding to the LED 12. More specifically, the first reflection structure includes a first recess group 17a and a second recess group 17b. The first recess group 17a is formed on the major surface of the light guide plate 8 facing toward the LED 12. The second recess group 17b is formed on the major surface of the light guide plate 8 facing toward the illumination window 5a. In the illustrated example, the LED 12, the first reflection structure (17a, 17b), and the illumination window 5a are linearly aligned.

The light guide plate 8 further includes a second reflection structure formed locally at a location corresponding to the illumination window 5b. The second reflection structure includes a third recess group 18. The LED 12 is not located immediately below the third recess group 18. The recess groups 17a, 17b, and 18 are formed by locally roughening the major surfaces of the light guide plate 8. The recess groups 17a, 17b, and 18 are each defined by fine conical recesses 19. The recesses 19 each have an inclined surface that diffuses and reflects light into the light guide plate 8 and dimensioned to be several micrometers to several tens of micrometers. The recesses 19 reflect light toward the corresponding illumination windows 5a and 5b. The dimension and shape of each recess groups 17a, 17b, and 18, the density of the recesses 19 in each of the recess groups 17a, 17b, and 18, the dimension and shape of the recesses 19 are controlled to reduce brightness differences between the illumination windows 5a and 5b. In the illustrated embodiment, the amount of light that passes through the first reflection structure toward the illumination window 5a is substantially the same as the amount of light reflected by the second reflection structure toward the illumination window 5b.

The operation of the operation device 1 will now be discussed. The solid arrows shown in FIG. 3 indicate the path of the light emitted from the LED 12.

The LED 12 first emits light in a direction perpendicular to the plane of the circuit board 6. The light, which is diffused and reflected by the first recess group 17a, enters the light guide plate 8. A controlled amount of the light that enters and perpendicularly travels through the light guide plate 8 is emitted toward the illumination window 5a. This illuminates the illumination window 5a. A controlled amount of the light that enters the light guide plate 8 is reflected by the second recess group 17b and travels through the light guide plate 8. As the light travels through the light guide plate 8, the light is reflected and diffused. When reaching the third recess group 18, A controlled amount of light is reflected by the third recess group 18 and emitted toward the illumination window 5b. This illuminates the illumination window 5b.

The preferred embodiment has the advantages described below.

(1) The LED 12 emits light in the direction in which light is emitted from the illumination windows 5a and 5b. The light guide plate 8 is arranged between the LED 12 and the illumination windows 5a and 5b. Thus, the LED 12 does not have to be arranged beside the light guide plate 8 like in the prior art, and the plurality of illumination windows 5 may be illuminated by the single LED 12. Accordingly, the number of components in the operation device 1 may be kept low, and the operation device does not have to be enlarged.

Further, the LED 12 is arranged at a position corresponding to one of the illumination windows 5a and 5b (specifically, 5a). The light guide plate 8 includes the first recess groups 17a and second recess groups 17b arranged at a location corresponding to the LED 12. The other one of the illumination windows 5a and 5b (specifically, 5b) is not arranged at a position corresponding to the LED 12. Instead, the light guide plate 8 includes the third recess group 18 located at a position corresponding to the other one of the illumination windows 5a and 5b (specifically, 5b). In this structure, the light emitted from the LED 12 travels through the light guide plate 8 and toward the corresponding illumination window 5a. Some of the light emitted from the LED 12 travels through the light guide plate 8 as it is diffused and reflected by the first recess group 17a and second recess group 17b. This light is further reflected by the third recess group 18 and emitted toward the illumination window 5b. Thus, the illumination of the plurality of illumination windows 5a and 5b is ensured. Additionally, even though the LED 12 is arranged at a position corresponding to only one of the illumination windows 5a and 5b, the plurality of illumination windows 5a and 5b are illuminated with the LED 12, the quantity of which is less than the illumination windows 5a and 5b. This enables the lighting device (operation device 1) to be compact, simple, and have a high level of freedom for the layout of the LED 12.

(2) The first reflection structure and the second reflection structure are each formed by roughening the major surfaces of the light guide plate 8. Thus, there is no need to prepare separate components for diffusing and reflecting the light from the LED 12. This prevents the number of components of the lighting device (operation device 1) from increasing.

(3) The first reflection structure is defined by the rough surface portions (first recess group 17a and second recess group 17b) of the light guide plate 8 locally formed on the part of the upper surface facing the illumination window 5a and the part of the lower surface facing the LED 12. The second reflection structure is defined by the rough surface portion (third recess group 18) of the light guide plate 8 locally formed on the part of the lower surface corresponding to the illumination window 5b. The rough surface portions formed on the upper surface of the light guide plate 8 facing toward the illumination window 5a functions to reflect the light than enters the light guide plate 8. The light from the LED 12 is effectively guided into the light guide plate 8 and emitted in the desired direction. This enables the emission of the desired amount of light from the illumination windows 5a and 5b and illuminates the letters on each operation portion 4 with sufficient brightness.

(4) The recess groups 17a, 17b, and 18 each have recesses 19 of which shape, size, and density are controlled. The amount of light diffused and reflected by the first to third recess groups 17a, 17b, and 18 are controlled with high accuracy by controlling the shape, size, and density of the recesses 19. Thus, brightness differences and color unevenness between the illumination windows 5a and 5b may be reduced by controlling the amount of light emitted toward the illumination window 5a, which is located at a position corresponding to the LED 12, and the amount of light emitted toward the illumination window 5b, which is not located at a position corresponding to the LED 12.

(5) The first and second recess groups 17a and 17b incline the path of light emitted from the LED 12 relative to a plane parallel to the light guide plate 8. The inclination causes light to travel through the light guide plate 8 as it is repetitively reflected by the upper and lower surfaces of the light guide plate 8. When reaching the third recess group 18, the light is emitted toward the illumination window 5b. Thus, only a small amount of light passes by the third recess group 18 and out of the end surface of the light guide plate 8 in the lateral direction. This illuminates the illumination window 5b, which is spaced from the LED 12, with a sufficient amount of light.

Figure 5:
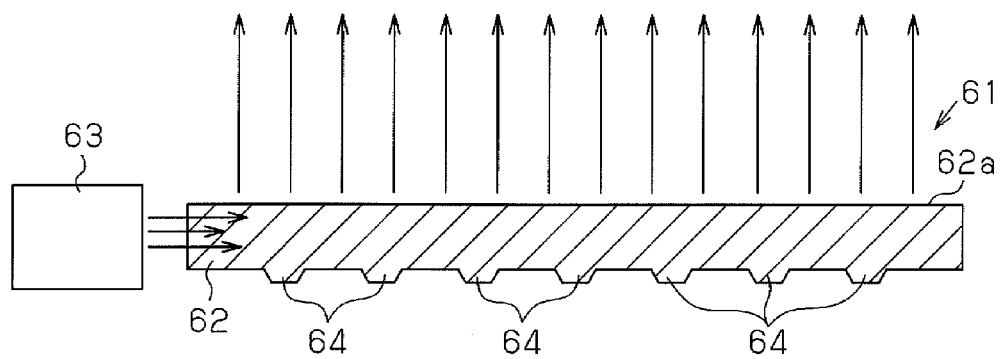
FIG. 5 is a diagram showing light redirected by recesses of the light guide plate.

Comparatively, with the side-view type operation device 61 of the prior art shown in FIG. 5, the light of the light source 63 enters the light guide plate 62 along a plane parallel to the light guide plate 62. Thus, the light of the light source 63 has a tendency of being emitted in the lateral direction from the end surface of the light guide plate 62, which is located on the opposite side of the light source 63. Accordingly, to illuminate the illumination windows 57a and 57b with a sufficient amount of light, additional reflective material must be arranged at the end surface of the light guide plate 62.

It should be apparent to those skilled in the art that the present invention may be embodied in many other specific forms without departing from the spirit or scope of the invention. Particularly, it should be understood that the present invention may be embodied in the following forms.

Either one of the first recess group 17a and the second recess group 17b that form the first reflection structure may be eliminated. The rough surface portion defining the second reflection structure may be formed on both of the upper and lower surfaces of the light guide plate 8 at locations corresponding to the illumination window 5b. Alternatively, the rough surface portion defining the second reflection structure may be formed on only the upper surface of the light guide plate 8 at a location corresponding to the illumination window 5b.

The recesses 19 may each be shaped as a polygonal cone, such as a tetragonal cone or a hexagonal cone. Further, the recesses 19 do not have to be tapered and may be shaped as, for example, a cylinder.

The shape, size, and density of the recesses 19 defining the first to third recess groups 17a, 17b, and 18 may be indefinite. For example, the first to third recess groups 17a, 17b, and 18 may be formed through grain finishing such as sandblasting.

The first and second reflection structures may be formed by groups of projections.

The light source is not limited to the LED 12 and may be any light emitting body that emits light in a direction perpendicular to the light guide plate 8, such as an incandescent lamp bulb or an electroluminescence (EL) element.

The lighting device is not limited to the operation device 1 including operation portions and does not have to include operation portions as long as it is a device that illuminates a plurality of illumination windows.

The cover panel 2 may be plate-shaped. Alternatively, the cover panel 2 may be box-shaped.

The present examples and embodiments are to be considered as illustrative and not restrictive, and the invention is not to be limited to the details given herein, but may be modified within the scope and equivalence of the appended claims.

What is claimed is:
1. A lighting device comprising:
 a cover panel including a plurality of illumination windows;
 a light source arranged in the cover panel at a location corresponding to a first one of the illumination windows to emit light in a first direction;

a plate-shaped light guide arranged between the cover panel and the light source along a plane perpendicular to the first direction;

a first reflection structure formed on the light guide at a location corresponding to the light source, with the first reflection structure emitting part of the light from the light source toward the first illumination window and diffusing and reflecting the remaining light to guide the remaining light into the light guide; and a second reflection structure formed on the light guide at a location spaced from the location corresponding to the light source and corresponding to a remote one of the illumination windows excluding the first illumination window to reflect the light guided into the light guide toward the remote illumination window.

2. The lighting device according to claim 1, wherein:

the light guide includes a first major surface facing toward the plurality of illumination windows and a second major surface facing toward the light source; and the first reflection structure and the second reflection structure are each defined by a rough surface portion formed on at least either one of the first major surface and the second major surface.

3. The lighting device according to claim 2, wherein either one of the first reflection structure and the second reflection structure includes a plurality of recesses or a plurality of projections of which shapes and sizes are controlled.

4. The lighting device according to claim 2, wherein the first and second reflection structures are each defined by a grain-finished portion formed on at least either one of the first and second surfaces of the light guide.

5. The lighting device according to claim 2, wherein the first reflection structure includes a first rough surface portion formed on the first major surface of the light guide and a second rough surface portion formed on the second major surface facing toward the first rough surface portion.

6. The lighting device according to claim 1, wherein the remote illumination window is spaced from a location immediately above an emission portion of the light source.

7. The lighting device according to claim 1, wherein the amount of light that passes through the first reflection structure is substantially the same as the amount of light reflected by the second reflection structure toward the remote illumination window.

8. A lighting device comprising:

a light source;

a plate-shaped light guide extending in a direction perpendicular to a direction in which light is emitted from the light source; and a cover panel covering the light guide plate and including a plurality of illumination windows illuminated by the light from the light source, with the plurality of illumination windows including a first illumination window arranged immediately above an emission portion of the light source and a remote illumination window arranged at a location spaced from the light source and from the first illumination window;

the light guide including:

a first reflection structure locally formed at a location corresponding to the light source and the first illumination window; and a second reflection structure locally formed at a location corresponding to the remote illumination window, the first reflection structure transmitting a controlled amount of the light from the light source toward the first illumination window and guiding the remaining light into the light guide, and the second reflection structure reflecting a controlled amount of the light guided into the light guide toward the remote illumination window.

9. The lighting device according to claim 8, wherein the amount of light that passes through the first reflection structure and directed toward the first illumination window is substantially the same as the amount of light reflected by the second reflection structure toward the remote illumination window.

\* \* \* \* \*